US012302802B2

(12) United States Patent
Dai

(10) Patent No.: US 12,302,802 B2
(45) Date of Patent: May 20, 2025

(54) HAND-PUSH LEAF SUCTION MACHINE WITH AUTOMATIC OUTAGE FUNCTION FOR TOPPLING

(71) Applicant: SHAOXING SHANGYU GUANYE ELECTRICAL APPLIANCE CO., LTD., Zhejiang (CN)

(72) Inventor: Guangqian Dai, Zhejiang (CN)

(73) Assignee: SHAOXING SHANGYU GUANYE ELECTRICAL APPLIANCE CO., LTD., Zhejiang (CN)

( * ) Notice: Subject to any disclaimer, the term of this patent is extended or adjusted under 35 U.S.C. 154(b) by 204 days.

(21) Appl. No.: 17/628,186

(22) PCT Filed: May 15, 2020

(86) PCT No.: PCT/CN2020/090413
§ 371 (c)(1),
(2) Date: Jan. 18, 2022

(87) PCT Pub. No.: WO2021/164140
PCT Pub. Date: Aug. 26, 2021

(65) Prior Publication Data
US 2022/0377989 A1 Dec. 1, 2022

(30) Foreign Application Priority Data
Feb. 22, 2020 (CN) .......................... 202010109560.6

(51) Int. Cl.
*A01G 20/47* (2018.01)
*A47L 5/28* (2006.01)
(Continued)

(52) U.S. Cl.
CPC ................ *A01G 20/47* (2018.02); *A47L 5/28* (2013.01); *A47L 9/009* (2013.01); *A47L 9/1409* (2013.01);
(Continued)

(58) Field of Classification Search
CPC ................ A47L 9/2842; A47L 9/2889; A47L 9/2836–9/2852; A47L 9/08; A01G 20/47;
(Continued)

(56) References Cited

U.S. PATENT DOCUMENTS 5,706,638 A * 1/1998 Kinder ................. A01D 34/475
56/11.9
7,458,784 B2 * 12/2008 Vos ......................... B62B 1/125
417/234
(Continued)

FOREIGN PATENT DOCUMENTS

CN 101492910 A * 7/2009
CN 109898453 A 6/2019

*Primary Examiner* — Eric J Rosen
*Assistant Examiner* — Sharonda T Felton
(74) *Attorney, Agent, or Firm* — Jose Cherson Weissbrot

(57) ABSTRACT

The present disclosure discloses a hand-push leaf suction machine with an automatic outage function for toppling which includes a housing provided with an air duct, a fan fixedly arranged in the housing, a dust collecting box, ground wheels arranged on two sides of the housing and supported on ground, auxiliary wheels arranged on two sides of the housing and supported on the ground, and a push handle arranged at a rear end of the housing.

9 Claims, 9 Drawing Sheets

(51) Int. Cl.
*A47L 9/00* (2006.01)
*A47L 9/14* (2006.01)
*A47L 9/22* (2006.01)
*A47L 9/28* (2006.01)
*A47L 9/32* (2006.01)

(52) U.S. Cl.
CPC ............... *A47L 9/22* (2013.01); *A47L 9/2868* (2013.01); *A47L 9/2884* (2013.01); *A47L 9/2889* (2013.01); *A47L 9/325* (2013.01)

(58) Field of Classification Search
CPC .... A01G 20/40; A01G 20/43; A01D 2101/00; A01D 34/82; A01D 2075/20; A01D 2075/28; A01D 2075/206; A01D 2074/203
See application file for complete search history.

(56) References Cited

U.S. PATENT DOCUMENTS

| | | | |
|---|---|---|---|
| 8,272,197 B2 * | 9/2012 | Jung | A01D 34/828 56/16.7 |
| 2004/0006842 A1 * | 1/2004 | Lee | A47L 5/36 15/351 |
| 2004/0221557 A1 * | 11/2004 | Dunning | B02C 18/14 56/344 |
| 2020/0039079 A1 * | 2/2020 | Brouwers | A47L 9/2826 |

* cited by examiner

HAND-PUSH LEAF SUCTION MACHINE WITH AUTOMATIC OUTAGE FUNCTION FOR TOPPLING

TECHNICAL FIELD

The present disclosure relates to the technical field of gardening tool, particularly to a hand-push leaf suction machine with an automatic outage function for toppling.

BACKGROUND

As economy develops rapidly, people become more conscious of the environment. Green planting is conducted in urban streets, parks, roads and other places to improve the environment. However, fallen leaves produced by the plants need to be cleaned up, and leaf suction machines are often used to clean the fallen leaves.

At present, Chinese patent No. CN109898453A issued on Jun. 18, 2019 discloses an energy-saving and convenient garden leaf suction machine for handling sticky leaves, including an engine seat, a push frame, a leaf collecting box, a ground wheel, a leaf suction fan, a leaf suction head, and a leaf removal device. A rear-end surface of the engine seat and a bottom end of the push frame are connected by electric welding; the push frame is connected with a periphery of the top of the leaf collecting box by a buckle; two sides of the engine seat are connected with the ground wheel in a fastened manner; a front-end surface of the engine seat is welded to a surface of one side of the leaf suction fan and is electrically connected by a wire; the other side of the leaf suction fan is locked and connected to one end of the leaf suction head through a flange; and the leaf removal device is arranged at the rear side inside the leaf suction head.

When the leaf suction fan in the above leaf suction machine is operated, leaves enter the leaf collecting box through the leaf suction head and the leaf suction fan. When the leaf suction fan operates at the same power, if there is a passage between the leaf suction fan and the leaf collecting box, it is more difficult to transport the leaves into the leaf collecting box; since the leaf collecting box of the above-mentioned leaf suction machine is located at the rear side of the leaf suction machine, the passage between the leaf suction fan and the leaf collecting box is long, thus reducing efficiency.

At the same time, when the leaf suction machine is operating, the following situations may sometimes cause safety problems: (1) When an operator leaves but does not turn off the equipment, the unattended machine presents safety problem for children and others who attempt to reach their hands into the running machine, (2) Safety issues rise when the power is not cut off during maintenance.

SUMMARY

The present disclosure aims to provide a hand-push leaf suction machine with an automatic outage function for toppling, which has an automatic outage function for toppling.

The above-mentioned technical purpose of the present disclosure is implemented by the following technical solution: a hand-push leaf suction machine with an automatic outage function for toppling, including a housing provided with an air duct, a fan arranged in the housing, a dust collecting box, ground wheels arranged on two sides of the housing and supported on the ground, auxiliary wheels arranged on two sides of the housing and supported on the ground, and a push handle arranged at a rear end of the housing; the dust collecting box is arranged at a front end of the housing, with a lower surface close to the ground; the height of a blade of the fan is in the middle of a height direction of the dust collecting box; the air duct includes an air inlet passage, one end of which is close to the ground and the other end of which is connected with the blade of the fan, and an air outlet passage, one end of which is connected with the blade of the fan and the other end of which is connected with the dust collecting box; the air outlet passage is connected with the top of a side surface of the duct collecting box close to the fan; the two auxiliary wheels are arranged on two sides of a lower end of the air inlet passage; a micro switch connected with a motor of the fan in series is arranged inside the housing; movable slots are formed in two sides of the housing; a wheel axle with two ends passing through the movable slots are movably arranged inside the movable slots; the two ground wheels are arranged at two ends of the wheel axle; a linkage mechanism located between the wheel axle and the micro switch and realizing turning on and turning off of the micro switch is arranged inside the housing; when the ground wheels and the auxiliary wheels are supported on the ground, the wheel axle slides to the tops of the movable slots and drive the linkage mechanism to press an on-off key of the micro switch to turn on the micro switch; the rear end of the housing is provided with two supporting legs; and when the housing tilts backwards to enable two supporting legs and the push handle to be supported on the ground, the wheel axle slides off to the bottoms of the movable slots under the gravity.

By adopting the above-mentioned solution, the height of the blade of the fan can be located to the middle of the height direction of the dust collecting box. The lower surface of the dust collecting box is close to the ground, the lower end of the air inlet passage is pressed close to the ground, and the upper end of the air outlet passage is connected to the top of the side surface of the dust collecting box, so that at this time, overall lengths of the air inlet passage and the air outlet passage are relatively small, which is conductive to improving the wind strength in the air duct. At the same time, the length of the air inlet passage is relatively small, which can increase the suction force of the fan; and the upper end of the air outlet passage is connected to the top of the side surface of the dust collecting box, which can increase the storage capacity of the dust collecting box and achieve effects of efficient leaf suction and increasing the leaf collection amount. Meanwhile, since the lower end of the air inlet passage is pressed close to the ground, if it touches the motor in the air duct, the housing needs to tilt backwards, and when the two supporting legs and the push handle are supported on the ground, the wheel axle slides off to the bottoms of the movable slots under the gravity, and at this time, the micro switch is in an off state, and the fan connected in series with the micro switch stops working; or the housing needs to topple towards two sides. When the ground wheels and the auxiliary wheels are supported on the ground, it is equivalent that the wheel axle drives, under the gravity of the whole leaf suction machine, the linkage mechanism to press the on-off key of the micro switch; at this time, after the housing topples over, the acting force on the wheel axle disappears, and the micro switch is also in the off state, thereby finally realizing the automatic outage function for toppling; and meanwhile, when the hand-push leaf suction machine is overall lifted up, the micro switch is also in the off state.

In one embodiment: the linkage mechanism includes a rotating sleeve rotatably connected in the housing, a push arm integrally arranged on the rotating sleeve and resisting against the top of the wheel axle, and a pressing arm integrally arranged on the rotating sleeve and used for pressing, after rotation, the on-off key of the micro switch; and in the process that the wheel axle slides to the tops of the movable slots, the wheel axle drives the push arm to rotate and then drive the pressing arm to press the on-off key of the micro switch.

By adopting the above-mentioned solution, when the ground wheels and the auxiliary wheels are supported on the ground, it is equivalent that the wheel axle is subjected to the acting force of the whole leaf suction machine; at this time, the wheel axle drives the push arm to rotate in the process of sliding to the tops of the movable slots, so that the rotating sleeve drives the pressing arm to press the non-off key of the micro switch; and when the micro switch is in an on state, the fan can be turned on or turned off through its own switch.

In another embodiment: a limiting slot for limiting a rotating angle of the pressing arm is arranged in the housing; when the pressing arm rotates to be close to one end of the limiting slot, the pressing arm presses the on-off key of the micro switch; and when the pressing arm rotates to resist against the other end of the limiting slot, the wheel axle interferes with the push arm in the process of upwards sliding along the movable slots, so as to drive the push arm to rotate.

By adopting the above-mentioned solution, the limiting slot is disposed to limit the rotating angle of the pressing arm; when the pressing arm rotates to resist against the other end of the limiting slot, the wheel axle interferes with the push arm in the process of upwards sliding along the movable slots, and at this time, the phenomenon that the push arm and the wheel axle are separated due to a too large rotating angle of the push arm and the pressing arm, thereby ensuring that the push arm is push to rotate when the wheel axle moves upwards.

In another embodiment: the tops of the movable slots slantways extend up towards the rear end of the housing.

By adopting the above-mentioned solution, the tops of the movable slots slantways extend up towards the rear end of the housing, so that a friction force when the wheel axle slides along the movable slots can be increased, thereby reducing the movement velocity of the wheel axle and reducing a hitting force when the wheel axle moves to two ends of the movable slots.

In another embodiment: the dust collecting box is detachably connected to the housing; the front end of the housing is provided with a supporting plate used for being supported at the bottom of the dust collecting box after the dust collecting box is mounted; the supporting plate is rotatably connected to the front end of the housing; when the rotating end of the supporting plate resists against the housing in a downwards rotating process, the dust collecting box is supported to an upper surface of the supporting plate after being mounted; and when the movable end of the supporting plate resists against the housing in an upwards rotating process, the movable end of the supporting plate slantways upwards extends towards the rear end of the housing.

By adopting the above-mentioned solution, the weight is increased after garbage in the dust collecting box is accumulated. The supporting plate is arranged at the bottom of the dust collecting box, so that stress on a dust collecting box and housing mounting position can be reduced, and the structural stability is improved. Meanwhile, when the rotating end of the supporting plate resists against the housing in the downwards rotating process, the dust collecting box is supported to the upper surface of the supporting plate after being mounted; and when the movable end of the supporting plate resists against the housing in the upwards rotating process, the movable end of the supporting plate slantways upwards extends towards the rear end of the housing, so as to realize collection.

In another embodiment: the blade of the fan is slantways disposed, with an upper end close to the dust collecting box. The lower end of the air inlet passage is close to the dust collecting box, and the upper end is connected with the blade of the fan after slantways extending. The lower end of the air outlet passage is connected with the blade of the fan, and the upper end is connected with the dust collecting box after slantways extending.

By adopting the above-mentioned solution, the blade of the fan is slantways disposed, with the upper end close to the dust collecting box; the lower end of the air inlet passage is close to the dust collecting box, and the upper end is connected with the blade of the fan after slantways extending; the lower end of the air outlet passage is connected with the blade of the fan, and the upper end is connected with the dust collecting box after slantways extending; at this time, bending of the air inlet passage and the air outlet passage in the extending process can be relieved, thereby improving the fluency when air flows in the air inlet passage and the air outlet passage.

In another embodiment: an adjustment assembly used for adjusting the height of the auxiliary wheel is arranged between each auxiliary wheel and the air inlet passage; the adjustment assembly includes an adjustment seat arranged on a side surface of the air inlet passage and having a plurality of adjustment holes arranged in a vertical direction, and a connection cover which passes through the middle part of the auxiliary wheel and is plugged and fixed to a plug shaft in any adjustment hole; and the auxiliary wheel is located between the adjustment seat and the connection cover and is rotatably connected to the plug shaft.

By adopting the above-mentioned solution, use environments on an ordinary ground and a grassland. When the leaf suction machine is used on the ordinary ground, an air inlet of the air inlet passage is pressed close to the ground to increase the suction force. When the leaf suction machine is used on the grassland, the height of the air inlet of the air inlet passage needs to be increased to prevent the problem of inconvenience in use caused by interference between the air inlet passage and the lawn. At this time, the heights of the auxiliary wheels can be adjusted through the adjustment assemblies, thereby adjusting the height of the air inlet of the air inlet passage to adapt to different use environments.

In another embodiment: the motor of the fan uses a battery pack to supply direct current or uses a power plug to be connected to the state grid to supply alternating current.

By adopting the above-mentioned solution, the leaf suction machine uses the battery pack to supply the direct current or uses the power plug to be connected to the state grid to supply the alternating current, so as to satisfy various usages.

In another embodiment: the push handle is rotatably connected to the rear end of the housing; one side of the rotating end of the push handle is provided with a rotating shaft rotatably connected to the housing; and the other side of the rotating end of the push handle is provided with a fixing assembly rotatably connected to the housing and used for fixing the rotating angle of the push handle.

In another embodiment: the fixing assembly includes a button axially telescopically arranged on the push handle along a rotating axis of the push handle, and a spring arranged between the button and the push handle and used for driving the button to move away from the push handle;

the button is provided with a rotating part rotatably connected to the housing and is provided with two snap-in parts symmetrically disposed along the rotating axis of the push handle; two snap-in slots for embedding the snap-in parts are formed in positions of the housing corresponding to the snap-in parts; when the button is pressed to compress the spring, the snap-in parts are separated from the snap-in slots to rotate the push handle; and when the two snap-in parts are respectively embedded in the two snap-in slots in two angles, the push handle is in an unfolded state for use or a folded state for collection.

By adopting the above-mentioned solution, when the button is pressed to compress the spring, the snap-in parts on the button are separated from the snap-in slots to rotate the push handle at this time; and since the two snap-in parts are symmetrically disposed along the rotating axis of the push handle, the two snap-in parts can be embedded in the two snap-in slots of the housing in two different angles, the push handle in the folded state is convenient to store.

Figure 1:
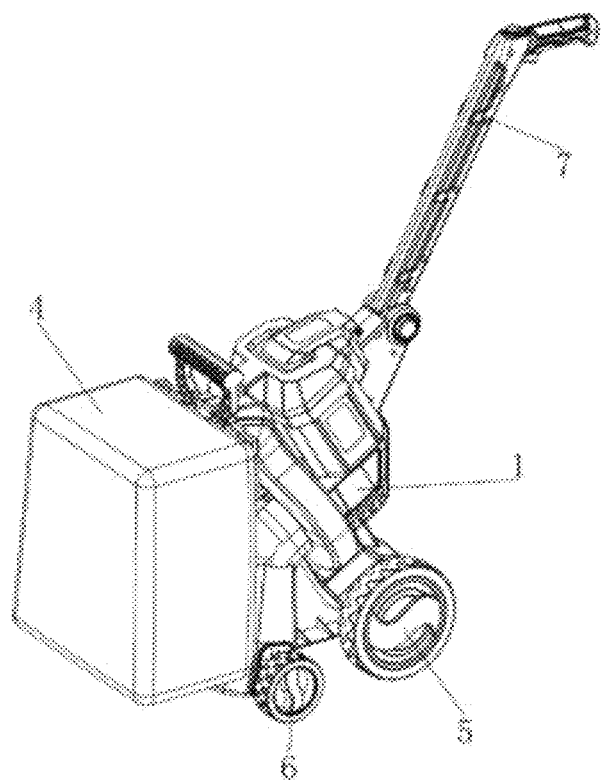
FIG. 1 is a schematic structural diagram of Embodiment 1.

Reference signs in the drawings: 1: housing: 11: air duct; 111: air inlet passage; 112: air outlet passage; 12: movable slot; 13: wheel axle; 14: limiting slot; 15: supporting leg; 16: supporting plate; 17: clamping slot; 2: fan; 31: battery pack; 32: power plug; 4: dust collecting box; 5: ground wheel; 6: auxiliary wheel; 7: push handle; 71: rotating shaft; 72: fixing assembly; 721: button; 7211: rotating part; 7212: snap-in part; 722: spring; 8: micro switch; 9: linkage mechanism; 91: rotating sleeve; 92: push arm; 93: pressing arm; 10: adjustment assembly; 101: adjustment seat; 1011: adjustment hole; 102: connection cover; and 1021: plug shaft.

DETAILED DESCRIPTION OF THE EMBODIMENTS

The present disclosure is further described in detail below in combination with accompanying drawings.

Embodiment 1: A leaf suction machine with an automatic outage function for toppling, as shown in FIG. 1 to FIG. 3, includes a housing 1 provided with an air duct 11, a fan 2 fixedly arranged in the housing 1, a dust collecting box 4 arranged at a front end of the housing 1, ground wheels 5 arranged on two sides of the housing 1 and supported on the ground, auxiliary wheels 6 arranged on two sides of the housing 1 and supported on the ground, and a push handle 7 arranged at a rear end of the housing 1.

Figure 2:
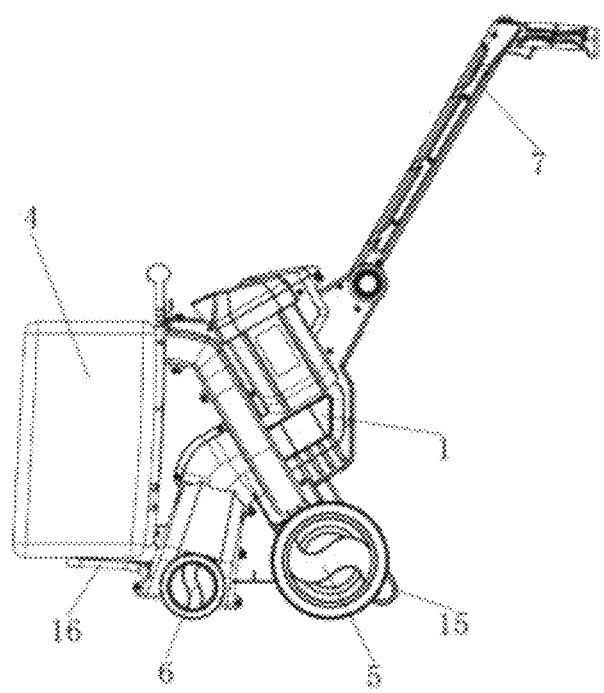
FIG. 2 is a front view of Embodiment 1.

As shown in FIG. 1 and FIG. 2, the dust collecting box 4 is detachably arranged at the front end of the housing 1, with a lower surface close to the ground. A plane where lowest points of the ground wheels 5 and the auxiliary wheels 6 are located can be equivalent to the ground. The mode of detachable connection of the dust collecting box 4 is the conventional art. For example, a mounting frame on the dust collecting box 4 is fastened on the housing 1 in a fastened manner. The front end of the housing 1 is provided with a supporting plate 16 used for being supported at the bottom of the dust collecting box 4 after the dust collecting box 4 is mounted; the supporting plate 16 is rotatably connected to the front end of the housing 1; when the rotating end of the supporting plate 16 resists against the housing 1 in a downwards rotating process, the dust collecting box 4 is supported to an upper surface of the supporting plate 16 after being mounted; and when the movable end of the supporting plate 16 resists against the housing 1 in an upwards rotating process, the movable end of the supporting plate 16 slantways upwards extends towards the rear end of the housing 1, so as to realize collection.

Figure 3:
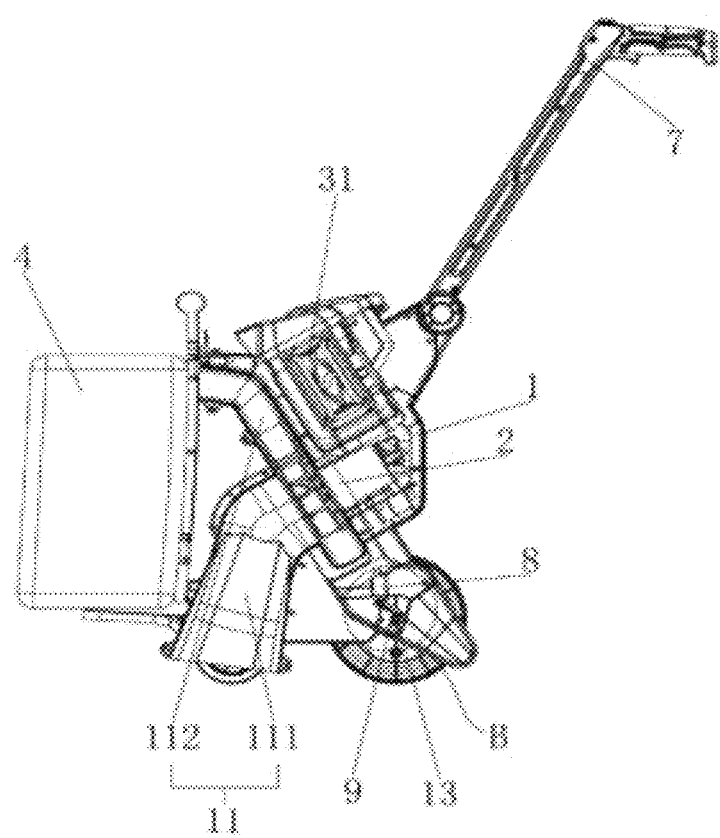
FIG. 3 is a partially sectional view of Embodiment 1.

As shown in FIG. 2 and FIG. 3, the height of a blade of the fan 2 is located in the middle of the height direction of the dust collecting box 4. The air duct 11 includes an air inlet passage 111, one end of which is close to the ground and the other end of which is connected with the blade of the fan 2, and an air outlet passage 112, one end of which is connected with the blade of the fan 2 and the other end of which is connected with the dust collecting box 4; and the air outlet passage 112 is connected with the top of a side surface of the duct collecting box 4 close to the fan 2. The blade of the fan 2 is slantways disposed, with an upper end close to the dust collecting box 4. The lower end of the air inlet passage 111 is close to the dust collecting box 4, and the upper end is connected with the blade of the fan 2 after slantways extending. The lower end of the air outlet passage 112 is connected with the blade of the fan 2, and the upper end is connected with the dust collecting box 4 after slantways extending.

Figure 4:
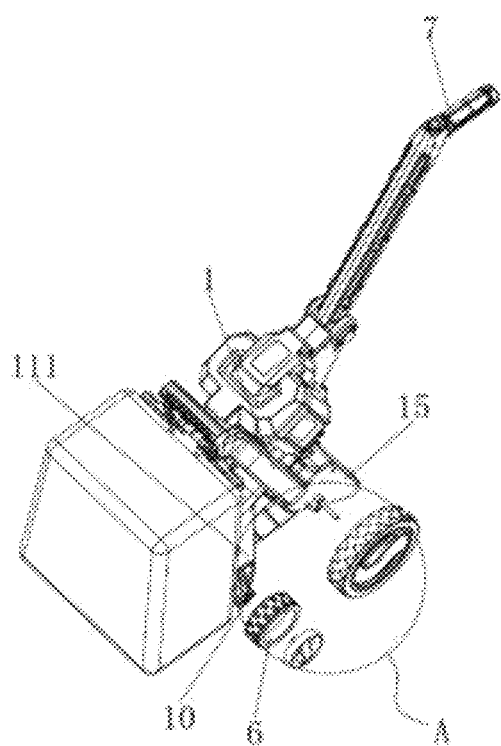
FIG. 4 is a partially exploded view of Embodiment 1.
Figure 5:
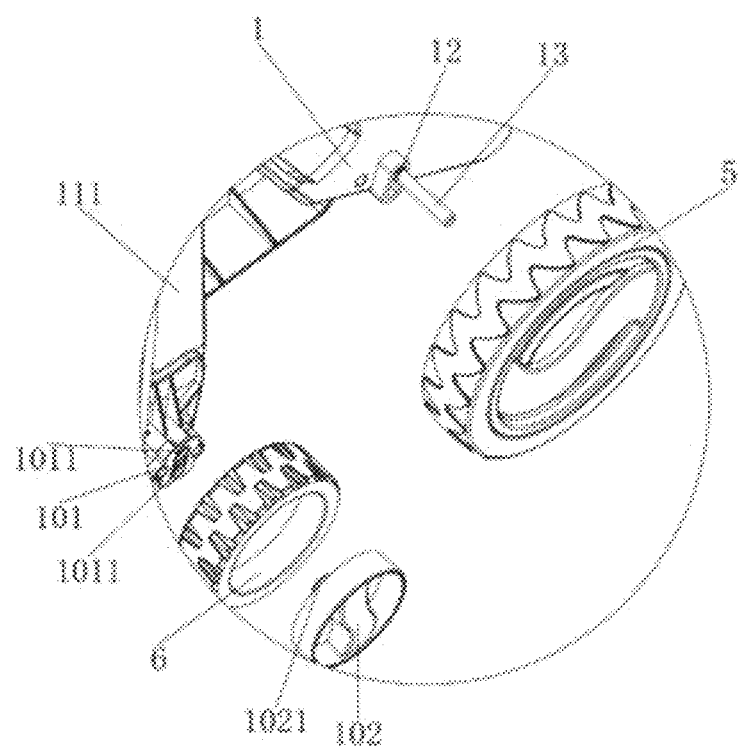
FIG. 5 is a partially enlarged diagram of a portion A in FIG. 4.
Figure 6:
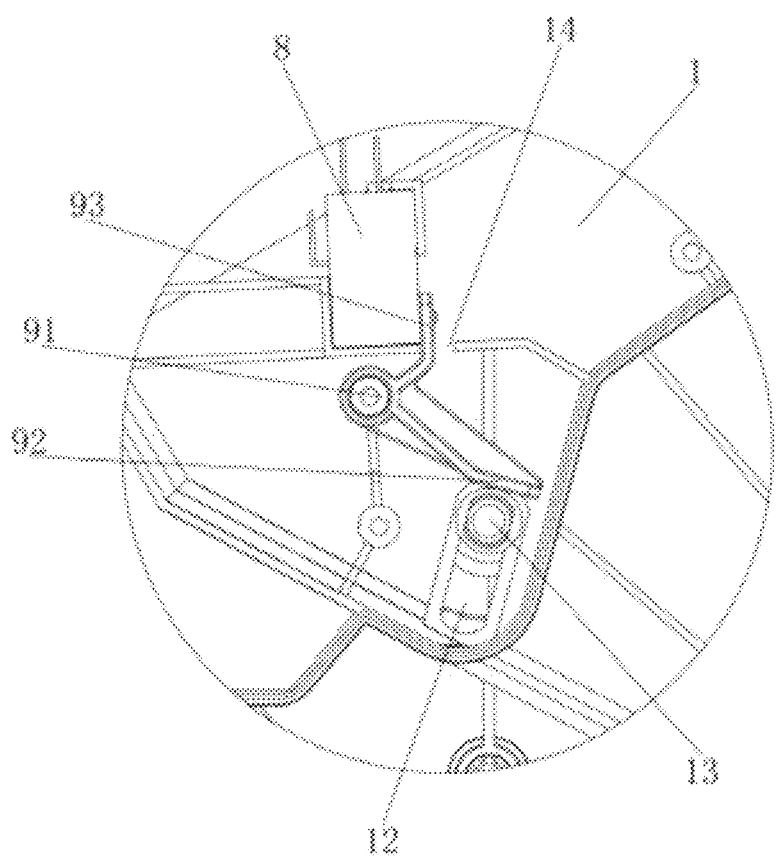
FIG. 6 is a partially enlarged diagram of a portion B in FIG. 3.

As shown in FIG. 4 and FIG. 5, two auxiliary wheels 6 are arranged on two sides of a lower end of the air inlet passage 111. An adjustment assembly 10 used for adjusting the height of the auxiliary wheel 6 is arranged between each auxiliary wheel 6 and the air inlet passage 111; the adjustment assembly 10 includes an adjustment seat 101 integrally arranged on a side surface of the air inlet passage 111 and having a plurality of adjustment holes 1011 arranged in a vertical direction, and a connection cover 102 which passes through the middle part of the auxiliary wheel 6 and is plugged and fixed to a plug shaft 1021 in any adjustment hole 1011; and the auxiliary wheel 6 is located between the adjustment seat 101 and the connection cover 102 and is rotatably connected to the plug shaft 1021.

As shown in FIG. 3 to FIG. 6, a micro switch 8 connected in series with a motor of the fan 2 is arranged inside the housing 1, and a battery pack 31 for supplying direct current is arranged in the housing 1. Movable slots 12 are formed in two sides of the housing 1; the tops of the movable slots 12 slantways extend up towards the rear end of the housing 1; a wheel axle 13 with two ends passing through the movable slots 12 are movably arranged inside the movable slots 12; the outer diameter of the wheel axle 13 is matched with the widths of the movable slots 12; and two ground wheels 5 are arranged at two ends of the wheel axle 13. A linkage mechanism 9 located between the wheel axle 13 and the micro switch 8 is arranged inside the housing 1. When the ground wheels 5 and the auxiliary wheels 6 are supported on the ground, the wheel axle 13 slides to the tops of the movable slots 12 and drives the linkage mechanism 9 to press an on-off key of the micro switch 8 to turn on the micro switch 8. The linkage mechanism 9 includes a rotating sleeve 91 rotatable connected in the housing, a push arm 92 integrally arranged on the rotating sleeve 91 and resisting against the top of the wheel axle 13, and a pressing arm 93 integrally arranged on the rotating sleeve 91 and used for pressing, after rotation, the on-off key of the micro switch 8. When the wheel axle 13 slides to the tops of the movable slots 12, the wheel axle 13 drives the push arm 92 to rotate, so as to drive the pressing arm 93 to press the on-off key of the micro switch 8. Meanwhile, a limiting slot 14 for limiting a rotating angle of the pressing arm 93 is arranged in the housing 1; when the pressing arm 93 rotates to be close to one end of the limiting slot 14, the pressing arm 93 presses the on-off key of the micro switch 8; and when the pressing arm 93 rotates to resist against the other end of the limiting slot 14, the wheel axle 13 interferes with the push arm 92 in the process of upwards sliding along the movable slots 12, so as to drive the push arm 92 to rotate.

As shown in FIG. 2 and FIG. 5, the rear end of the housing 1 is integrally provided with two supporting legs 15; and when the housing 1 tilts backwards to enable two supporting legs 15 and the push handle 7 to be supported on the ground, the wheel axle 13 slides off to the bottoms of the movable slots 12 under the gravity.

Figure 7:
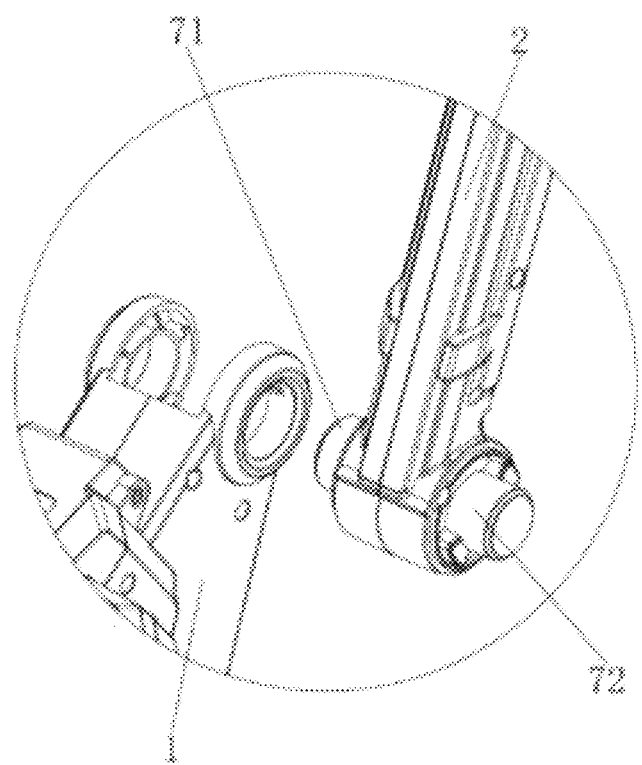
FIG. 7 is an exploded diagram I of a partial structure of a joint of a push handle and a housing in Embodiment 1.
Figure 8:
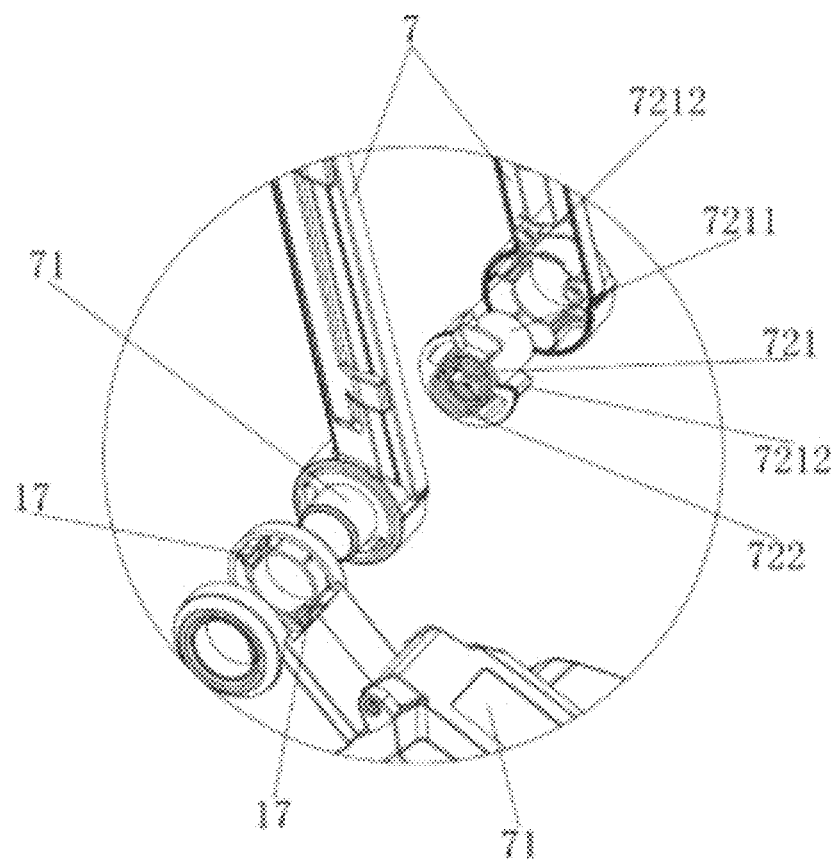
FIG. 8 is an exploded diagram II of a partial structure of a joint of a push handle and a housing in Embodiment 1.

As shown in FIG. 1, FIG. 7, and FIG. 8, the push handle 7 is rotatably connected to the rear end of the housing 1; one side of the rotating end of the push handle 7 is integrally provided with a rotating shaft 71 rotatably connected to the housing 1; and the other side of the rotating end of the push handle 7 is provided with a fixing assembly 72 rotatably connected to the housing 1 and used for fixing the rotating angle of the push handle 7. The fixing assembly 72 includes a button 721 axially telescopically arranged on the push handle 7 along a rotating axis of the push handle 7, and a spring 722 arranged between the button 721 and the push handle 7 and used for driving the button 721 to move away from the push handle 7. A rotating part 7211 rotatably connected to the housing 1 is formed on the button 721; two snap-in parts 7212 symmetrically disposed along the rotating axis of the push handle 7 are formed on the button 721; and two snap-in slots 17 for embedding the snap-in parts 7212 are formed in positions of the housing 1 corresponding to the snap-in parts 7212. When the button 721 is pressed to compress the spring 722, the snap-in parts 7212 are separated from the snap-in slots 17 to rotate the push handle 7; and when the two snap-in parts 7212 are respectively embedded in the two snap-in slots 17 in two angles, the push handle 7 is in an unfolded state for use or a folded state for collection.

Implementation effects: The height of the blade of the fan 2 is located in the middle of the height direction of the dust collecting box 4. The lower surface of the dust collecting box 4 is close to the ground, the lower end of the air inlet passage 111 is pressed close to the ground, and the upper end of the air outlet passage 112 is connected to the top of the side surface of the dust collecting box 4, so that at this time, the overall lengths of the air inlet passage 111 and the air outlet passage 112 are relatively small, which is conductive to improving the wind strength in the air duct 11. At the same time, the length of the air inlet passage 111 is relatively small, which can increase the suction force of the fan 2; and the upper end of the air outlet passage 112 is connected to the top of the side surface of the dust collecting box 4, which can increase the storage capacity of the dust collecting box 4 and achieve effects of efficient leaf suction and increasing the leaf collection amount.

When the ground wheels 5 and the auxiliary wheels 6 are supported on the ground, it is equivalent that the wheel axle 13 is subjected to the acting force of the whole leaf suction machine; at this time, the wheel axle 13 drives the push arm 92 to rotate in the process of sliding to the tops of the movable slots 12, so that the rotating sleeve 91 drives the pressing arm 93 to press the non-off key of the micro switch 8; and when the micro switch 8 is in an on state, the fan 2 can be turned on or turned off through its own switch.

Meanwhile, since the lower end of the air inlet passage 111 is pressed close to the ground, if it touches the motor in the air duct 11, the housing 1 needs to tilt backwards, and when the two supporting legs 15 and the push handle 7 are supported on the ground, the wheel axle 13 slides off to the bottoms of the movable slots 12 under the gravity, and at this time, the micro switch 8 is in an off state, and the fan 2 connected in series with the micro switch 8 stops working; or the housing 1 needs to topple towards two sides. When the ground wheels 5 and the auxiliary wheels 6 are supported on the ground, it is equivalent that the wheel axle 13 drives, under the gravity of the whole leaf suction machine, the linkage mechanism 9 to press the on-off key of the micro switch 8; at this time, after the housing 1 topples over, the acting force on the wheel axle 13 disappears, and the micro switch 8 is also in the off state, thereby finally realizing the automatic outage function for toppling; and meanwhile, when the hand-push leaf suction machine is overall lifted up, the micro switch 8 is also in the off state.

Figure 9:
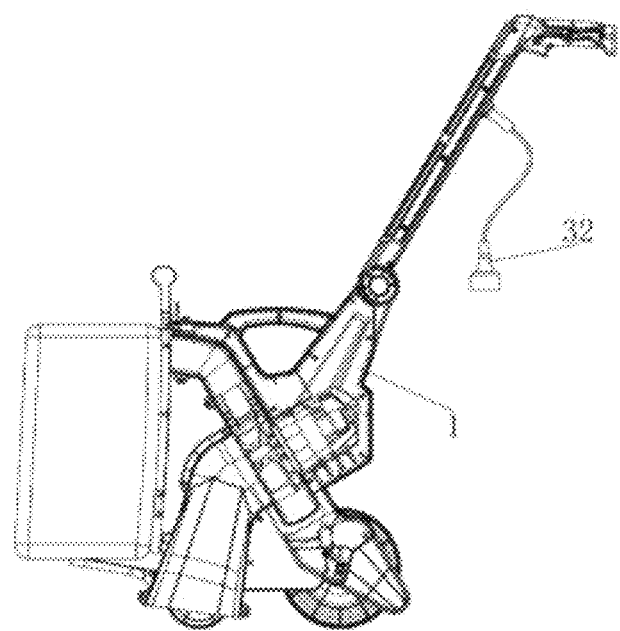
FIG. 9 is a schematic structural diagram of Embodiment 2.

Embodiment 2: A hand-push leaf suction machine with an automatic outage function for toppling, as shown in FIG. 9, has a difference from Embodiment 1 that no battery pack 31 is arranged in the housing 1; a power plug 32 is mounted on the housing 1; the power plug 32 is connected to the state grid to supply alternating current; and how the power plug 32 powers on other electrical elements is a conventional art, which is not described again.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

What is claimed is:
1. A handle-push leaf suction machine with an automatic outage function for toppling, comprising:
   a housing (1) provided with an air duct (11), a fan (2) fixedly arranged in the housing (1), a dust collecting box (4), two ground wheels (5) arranged on two sides of the housing (1) and supported on ground, two auxiliary wheels (6) arranged on two sides of the housing (1) and supported on the ground, and a push handle (7) arranged at a rear end of the housing (1),
   wherein the dust collecting box (4) is arranged at a front end of the housing (1), with a lower surface close to the ground; the height of a blade of the fan (2) is in the middle of a height direction of the dust collecting box (4); the air duct (11) comprises an air inlet passage (111), one end of the air duct is close to the ground and another end of the air duct is connected with the blade of the fan (2), and an air outlet passage (112), one end of the air outlet passage is connected with the blade of the fan (2) and the other end of the air outlet passage is connected with the dust collecting box (4); the air outlet passage (112) is connected with the top of a side surface of the duct collecting box (4) close to the fan (2); the two auxiliary wheels (6) are arranged on two sides of a lower end of the air inlet passage (111);

wherein a micro switch (8) connected with a motor of the fan (2) in series is arranged inside the housing (1); elongated slots (12) are formed in two sides of the housing (1); a wheel axle (13) with two ends passing through the elongated slots (12) are movably arranged inside the elongated slots (12); the two ground wheels (5) are arranged at two ends of the wheel axle (13); a linkage mechanism (9) located between the wheel axle (13) and the micro switch (8) and realizing turning on and turning off of the micro switch (8) is arranged inside the housing (1); when the two ground wheels (5) and the two auxiliary wheels (6) are supported on the ground, the wheel axle (13) slides to the top of the elongated slots (12) and drive the linkage mechanism (9) to press an on-off key of the micro switch (8) to turn on the micro switch (8);

wherein the rear end of the housing (1) is provided with two supporting legs (15); and when the housing (1) tilts backwards the two supporting legs (15) and the push handle (7) are supported on the ground, the wheel axle (13) slides off to the bottom of the elongated slots (12) under gravity;

wherein the linkage mechanism (9) further comprising a rotating sleeve (91) rotatably connected in the housing (1), a push arm (92) integrally arranged on the rotating sleeve (91) and resisting against top of the wheel axle (13), and a pressing arm (93) integrally arranged on the rotating sleeve (91), wherein the pressing arm is capable of pressing the on-off key of the micro switch (8) after rotation; and when the wheel axle (13) slides to the top of the elongated slots (12), the wheel axle (13) drives the push arm (92) to rotate and drives the pressing arm (93) to press the on-off key of the micro switch (8).

2. The hand-push leaf suction machine with the automatic outage function for toppling according to claim 1, wherein a limiting slot (14) for limiting a rotating angle of the pressing arm (93) is arranged in the housing (1); wherein an end of the pressing arm (93) away from the rotating sleeve (91) passes through the limiting slot (14);

when the pressing arm (93) rotates close to one end of the limiting slot (14), the pressing arm (93) presses the on-off key of the micro switch (8); and when the pressing arm (93) rotates to resist against another end of the limiting slot (14), the wheel axle (13) interferes with the push arm (92) to drive the push arm (92) to rotate.

3. The hand-push leaf suction machine with the automatic outage function for toppling according to claim 1, wherein the top of the elongated slots (12) extend towards the rear end of the housing (1).

4. The hand-push leaf suction machine with the automatic outage function for toppling according to claim 1, wherein the dust collecting box (4) is detachably connected to the housing (1); the front end of the housing (1) is provided with a supporting plate (16); a rotating end of the supporting plate (16) is rotatably connected to the front end of the housing (1); when the rotating end is rotated downward until a surface of the rotating end close to the housing (1) resists against the housing (1), the dust collecting box (4) is supported to an upper surface of the supporting plate (16); and when the rotating end is rotated upward until a movable end of the supporting plate (16) away from the rotating end resists against the housing (1), the movable end of the supporting plate (16) extends towards the rear end of the housing (1).

5. The hand-push leaf suction machine with the automatic outage function for toppling according to claim 1, wherein the blade of the fan (2) is disposed slantways, with an upper end near the dust collecting box (4); the lower end of the air inlet passage (111) is near the dust collecting box (4), and the upper end is connected with the blade of the fan (2);

and the lower end of the air outlet passage (112) is connected with the blade of the fan (2), and the upper end is connected with the dust collecting box (4).

6. The hand-push leaf suction machine with the automatic outage function for toppling according to claim 1, wherein an adjustment assembly (10) used for adjusting the height of the two auxiliary wheels (6) are arranged between each auxiliary wheel (6) and the air inlet passage (111); the adjustment assembly (10) further comprising an adjustment seat (101) arranged on a side surface of the air inlet passage (111) and having a plurality of adjustment holes (1011) arranged in a vertical direction, and a connection cover (102) passes through the middle part of each of the auxiliary wheels (6) and is plugged and fixed to a plug shaft (1021) in any one of the plurality adjustment holes (1011); and wherein the auxiliary wheels (6) are located between the adjustment seat (101) and the connector cover (102) and is rotatably connected to the plug shaft (1021).

7. The hand-push leaf suction machine with the automatic outage function for toppling according to claim 1, wherein the motor of the fan (2) uses a battery pack (31) to supply direct current or uses a power plug (32) to be connected to the state grid to supply alternating current.

8. The hand-push leaf suction machine with the automatic outage function for toppling according to claim 1, wherein the push handle (7) is rotatably connected to the rear end of the housing (1); one side of a rotating end of the push handle (7) is provided with a rotating shaft (71) rotatably connected to the housing (1); and another side of the rotating end of the push handle (7) is provided with a fixing assembly (72) rotatably connected to the housing (1) and used for fixing the rotating angle of the push handle (7).

9. The hand-push leaf suction machine with the automatic outage function for toppling according to claim 1, wherein the fixing assembly (72) further comprising a button (721) telescopically arranged on the push handle (7) along an axial direction of the rotating shaft (71) of the push handle (7), and a spring (722) is arranged between the button (721) and the push handle (7) and used for driving the button (721) to move away from the push handle (7); the button (721) is provided with a rotating part (7211) rotatably connected to the housing (1); the button (721) is provided with two snap-in parts (7212) symmetrically disposed along the rotating axis of the push handle (7); two snap-in slots (17) for embedding the snap-in parts (7212) are formed in positions of the housing (1) corresponding to the snap-in parts (7212);

when the button (721) is pressed to compress the spring (722), the snap-in parts (7212) are separated from the snap-in slots (17) to rotate the push handle (7); and when the two snap-in parts (7212) are respectively embedded in the two snap-in slots (17) in two angles, the push handle (7) is in an unfolded state or a folded state.

\* \* \* \* \*